Patented July 3, 1951

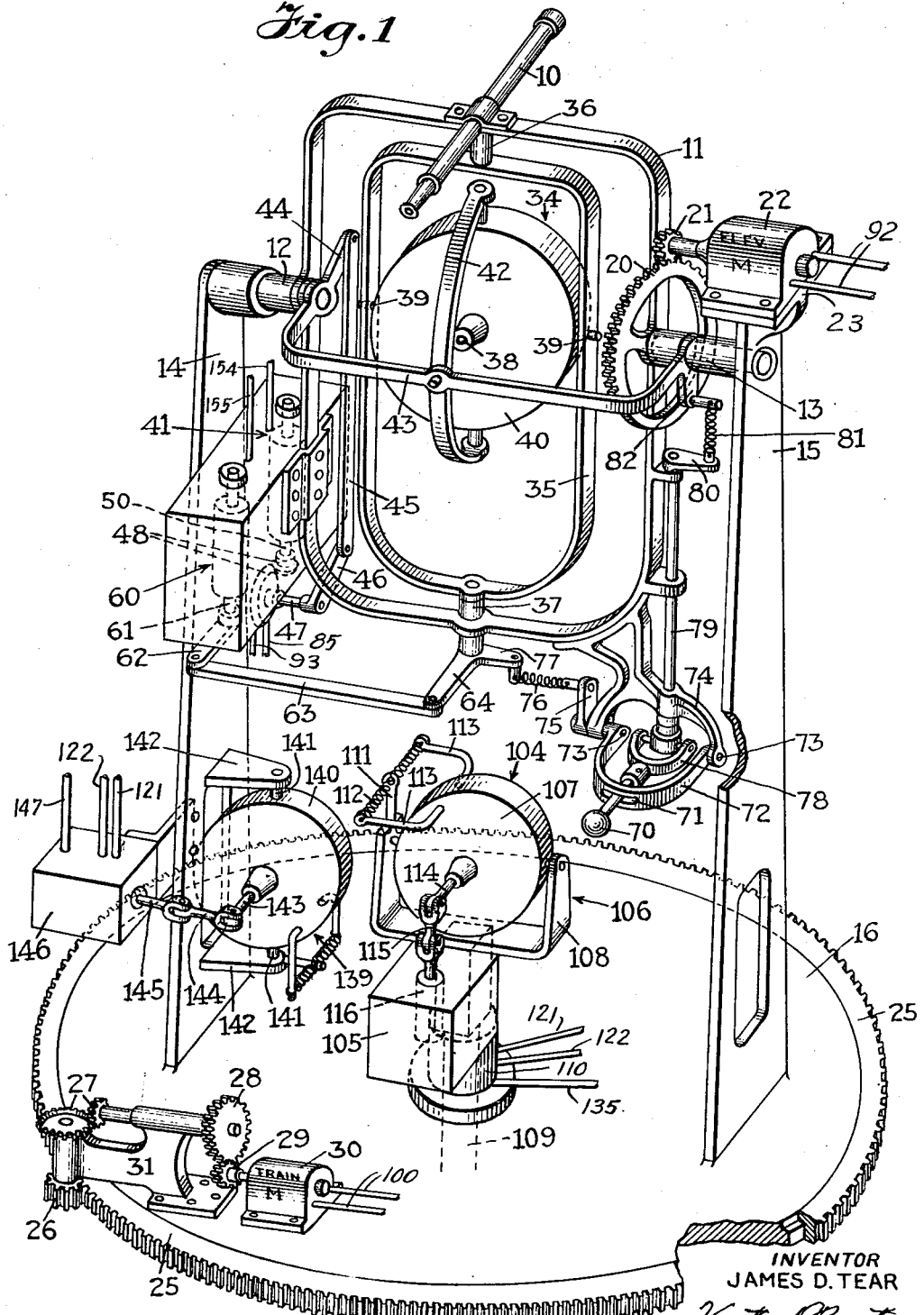

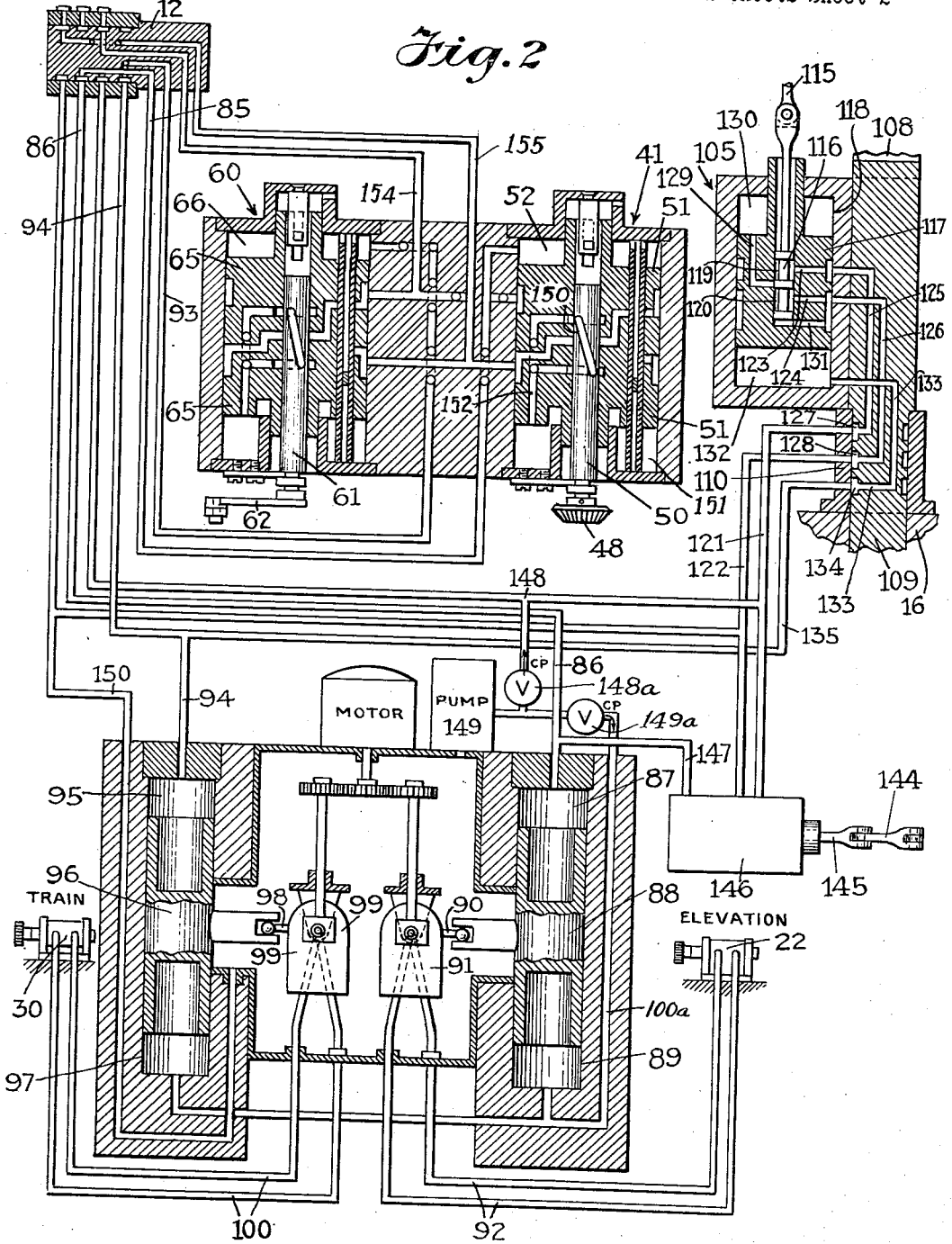

2,559,577

UNITED STATES PATENT OFFICE 2,559,577

GYROSCOPICALLY CONTROLLED HYDRAULIC ACTUATING APPARATUS WITH FOLLOW-UP AND STABILIZING MECHANISM

James D. Tear, Great Neck, N. Y., assignor to The Sperry Corporation, a corporation of Delaware Application September 27, 1944, Serial No. 555,972

18 Claims. (Cl. 60—53)

This invention relates to mechanism suitable for controlling the position of sights, guns or other devices on ships, tanks, airplanes and other movable supports. An object of this invention is to provide improved mechanism for controlling such devices on supports that are subject to sudden changes in angular position.

The present invention provides a quick acting control mechanism responsive to rate of change of position of the support and a follow-up mechanism operating in conjunction therewith for effecting accurate positioning of the controlled device in accordance with the position of a control gyroscope or other direction controlling signal.

In one embodiment the power unit of the control and follow-up mechanism is of the hydraulic type utilizing a variable speed reversible hydraulic transmission including a variable displacement pump driven at constant speed to supply fluid at a variable rate determined by the position of a tilting box or control element of the pump so that the direction and amount of flow to a hydraulic motor is proportional to the direction and amount of movement of the control element of the pump from its midposition. Such a transmission may be of the type known as a Waterbury gear or as a Vickers transmission.

The pump control element of the hydraulic variable speed transmission may be controlled hydraulically by valve mechanism which may include a pilot valve and a control piston operating in a response volume chamber and responsive to variations in volume of fluid supplied thereto. The total volume of the connected hydraulic chambers for actuating this piston is referred to as "response volume." This response volume may be controlled by a response volume generating valve having a member which is movable in accordance with the position of a control element to generate a response volume suited to actuate the control piston of the hydraulic transmission.

The response volume generating valve may be controlled by any suitable signal for producing a response volume suited to control the hydraulic transmission in a manner to position the driven element in accordance with the signal. In the embodiment shown this signal is represented by the spin axis of a controlling gyroscope. Separate sets of control valves and transmissions may be used for driving the driven element in train and in elevation. One system of this type is set forth more in detail in the co-pending application of Newell, Tear and Brown, Ser. No. 534,330, filed May 5, 1944. Such a system is suited for use on shipboard where the movement of the ship is substantially uniform and may be represented by sine curves. In such cases it is adapted to cause the driven element to follow the movement of the controlling element without appreciable lag. It has been found, however, that when placed in vehicles such as tanks, or other supports which are subject to sudden changes in position, certain conditions may arise requiring more rapid response to the movement of the support. The present invention accordingly provides mechanism for improving the operation of a system of the type above identified and for increasing the accuracy of response thereof to rapid changes in angular position of the support.

In accordance with the present invention, this is accomplished by introducing an additional response volume generating valve into the system and controlling the latter valve by a gyrometer which is designed to respond rapidly to the rate of change of angular position of the support. This additional valve introduces into the system an immediate and substantial change in response volume which causes a corresponding rapid response of the hydraulic transmission. This is supplemented by the follow-up mechanism so that the driven element maintains its correct controlled position relative to the controlling gyroscope irrespective of sudden angular movements of the support.

The response volume generating valve actuated by the control gyroscope is at all times effective in providing the necessary fine adjustment required for accurately controlling the device. The gyrometer measures the rate of movement of the support and introduces a controlling factor which is proportional thereto and causes the hydraulic transmission to operate more rapidly than if the gyroscopically controlled valves alone were used for control purposes.

Although the novel features which are believed to be characteristic of this invention are pointed out more particularly in the claims appended hereto, the invention itself will be better understood by referring to the following description, taken in connection with the accompanying drawings in which a specific embodiment thereof has been set forth for purposes of illustration.

In the drawings:

Fig. 1 is a perspective view of a control mechanism embodying the present invention; and Fig. 2 is a schematic diagram of the hydraulic connections thereof.

Certain specific terms are used herein for convenience in referring to various details of the invention. It is to be understood, however, that these terms are to be given an interpretation commensurate with the state of the art.

In Fig. 1 the invention is shown as applied to a mechanism for controlling the angular position of a telescope 10 relative to the support on which the mechanism is mounted. In the embodiment shown the telescope 10 is mounted directly on a power driven ring 11. It is to be understood, however, that this construction is only illustrative and that the telescope 10 may represent any sight or device which is to be controlled and which may be located at a remote point and mounted to be driven by suitable repeaters in accordance with the position of the power driven ring 11.

The driven ring 11 is shown as mounted on trunnions 12 and 13, supported in brackets 14 and 15 respectively which are mounted on a turntable 16. The ring 11 is provided with a circular rack 20 which is driven by a pinion 21 actuated by an elevation motor 22 which is mounted on a platform 23 on the bracket 15. The turntable 16 is driven relative to a stationary circular rack 25 through gears 26, 27 and 28 from a pinion 29 driven by a train motor 30 mounted on the turntable 16. The circular rack 25 is fixedly secured to the support on which the mechanism is mounted. The gears 26, 27 and 28 are shown as mounted on shafts journalled in a bracket 31 attached to the turntable 16.

A control gyroscope 34 having a spin axis 38 is mounted in a casing or housing 40 carried by a train gimbal 35, which is mounted in ring 11 on trunnions 36 and 37 to turn about an axis perpendicular to the axis of the trunnions 12 and 13. The gyroscope housing 40 is pivoted by pins 39 for movement in elevation in the train gimbal 35.

The elevational movement of the gyroscope 34 relative to the power driven ring 11 is applied to an elevation response volume generating valve 41 by a linkage including a bail 42 pivoted to the housing 40 of the gyroscope about an axis perpendicular to the axis of the pins 39. The bail 42 is pivotally attached to an elevation bail 43 which is pivoted on the trunnions 12 and 13 of the power driven ring 11 and carries an arm 44 which is connected by a link 45 to an arm 46 attached to a shaft 47 which is connected by gears 48 to control the position of the valve 41. The valve 41 is mounted on the ring 11 for movement therewith.

In the embodiment shown the valve 41 includes a rotating valve shaft 50 (Fig. 2) which is driven by gears 48 and is adapted to cause axial movement of a sleeve 51 which is a function of the rotational movement of the valve shaft 50. This axial movement of the sleeve 51 may be accomplished hydraulically as described more in detail in the co-pending application Ser. No. 534,330 above identified or mechanically by suitably threading the shaft 50. It is to be understood that the valve 41 may be of any other suitable type, for example, the type involving an axially movable member positioned by the link 45 and having hydraulic follow-up means to cause the sleeve 51 to follow the movement thereof similar to the valve 105 to be described. In any event, the valve 41 includes a response volume generating chamber 52 (Fig. 2), the volume of which is varied as a function of the axial displacement of the sleeve 51, which in turn is moved as a function of the elevational displacement of the spin axis of the gyroscope relative to the ring 11.

In the specific embodiment shown the valve 41 includes a shaft 50 having a spiral groove 150 and having a sleeve 51 which is slidable axially. A chamber 151 is formed below the sleeve 51 and communicates through passage 152 with either a pressure duct 154 or a return duct 155 depending upon the rotational position of the groove 150 and the axial position of the sleeve 51. The arrangement is such that rotation of the shaft 50 causes the sleeve 51 to feed upwardly or downwardly due to the change in hydraulic pressure in the chamber 151.

The valve 60 is similiarly constructed and separates in the same manner.

Train movement of the gyroscope 34 and of the train gimbal 35 is applied to a train response volume generating valve 60 which may be of the same type as the valve 41 above described and is also mounted on the driven ring 11. The valve 60 may include a rotating valve shaft 61 actuated by an arm 62 by means of a link 63 attached to an arm 64 secured to the trunnion 37 of the train gimbal 35 and movable in train therewith. The valve 60 also includes a sleeve 65 (Fig. 2) movable axially to vary the volume of a response volume chamber 66 and arranged so that movement in train of the gyroscope 34 with respect to the driven ring 11 produces a corresponding variation in the response volume chamber 66.

Precessing forces for causing the gyroscope 34 to precess in train and in elevation are shown as applied mechanically by means of a handle 70 which extends through an elongated slot 71 in a bail 72 mounted on trunnions 73 for vertical angular movement in a bracket 74 attached to the driven ring 11. One of the trunnions 73 carries an arm 75 which is connected by a spring 76 to an arm 77 attached to the trunnion 37 and arranged so that vertical movement of the handle 70 applies a torque about the axis of the trunnions 36 and 37 suited to cause the gyroscope 34 to precess in elevation in the direction of movement of the handle 70.

The handle 70 extends from a yoke 78 which is pivotally attached to a shaft 79 journalled in the bracket 74 and carrying at its upper end an arm 80 connected by a spring 81 to an arm 82 attached to the elevation bail 43 and arranged so that rotational movement of the shaft 79 produced by shifting the handle 70 to the right or left applies a torque to the gyroscope about the axis of pins 39 to cause the gyroscope to precess in train in the direction of movement of the handle 70.

Referring now to Fig. 2, it will be noted that the response volume chamber 52 of the elevation valve 41 is connected by a duct 85 through trunnion 12 and duct 86 to a response volume chamber 87 to actuate a piston 88 operating in a cylinder 89 to control the position of a control arm 90 which controls the volume and direction of flow of liquid pumped by a variable displacement pump 91 which constitutes a part of the elevation variable speed reversible hydraulic transmission and is connected by ducts 92 to drive the elevation motor 22. It is to be understood that the hydraulic control of the position of the piston 88 may include a pilot valve if desired as shown more in detail in the co-pending application above identified and in Kendrick Patent 2,304,831, dated December 15, 1942, entitled "Fluid Pressure Control."

Similarly, the response volume chamber 66 of the train valve 60 is connected by a duct 93 through trunnions 12 and duct 94 to a train response volume chamber 95 to actuate a piston 96 operating in a cylinder 97 to control the position of a control arm 98 which controls the operation of a variable displacement pump 99 similar to the pump 91. The pump 99 is connected by ducts 100 to drive the train motor 30.

In accordance with the present invention an additional train response volume generating valve 105 is provided which is controlled by the gyrometer 106 (Fig. 1). The gyrometer 106 comprises a gyroscope 104 mounted in a housing 107 which is pivoted for elevational movement in a fixed bracket 108 which is attached to a fixed post 109 mounted on the main support (not shown) and extending through a sleeve 110 on the turntable 16. The bracket 108 carries a vertical post 111 which is connected to the midpoint of a spring 112, the ends of which are attached to arms 113 secured to the gyroscope housing 107. The spring 112 applies a precessing force to the gyroscope 104 which is proportional to the displacement of the spin axis of the gyroscope from parallelism with the plane of the truntable 16. Because the bracket 108 is secured to the support, movement of the support in train will forcibly turn the gyroscope 104 in train, thereby causing the gyroscope to turn in elevation from its central position parallel with the plane of the turntable 16 until the unbalance of the spring 112 applies a precessing force sufficient to cause the gyroscope to be precessed in train at a rate equal to the rate of movement of the support in train. The displacement of the gyroscope from its central position is therefore proportional to the rate of movement of the support in train. The gyroscope housing 107 is connected by a pin 114 and a link 115 to a pilot valve 116 in the response volume generating valve 105 (Fig. 2). The pilot valve 116 is slidable in an axial bore of a sleeve 117, the latter being slidable axially in a cylinder 118. The gyrometer 106 has been shown as mounted on a fixed post 109. It may be desirable in certain instances, however, to mount the gyrometer on the turntable 16 in which case it may be geared to be driven counter thereto so as to remain stationary with respect to the support.

The pilot valve 116 is provided with annular fluid chambers 119 and 120 which are connected respectively to a high pressure duct 121 and a low pressure duct 122 by means of passages 123 and 124 respectively in the sleeve 117, passages 125 and 126 in the post 109, and hydraulic slip rings 127 and 128 in the sleeve 110. A passage 129 in the sleeve 117 extends from the center of the valve 116 to a chamber 130 formed by the upper end of the sleeve 117 within the cylinder 118. The passage 129 is normally closed by the central portion of the valve 116 but is placed into communication with either the high pressure passage 123 or the low pressure passage 124 in response to axial movement of the valve 116 from its median position. The low pressure passage 124 is connected by a passage 131 to the lower end of the bore within the sleeve 117 so as to eliminate back pressure which would interfere with the operation of the valve 116. A chamber 132 in the cylinder 118 below the sleeve 117 is connected by a passage 133 in the post 109, hydraulic slip ring 134 and duct 135 to the train response volume duct 94 above mentioned.

The operation of the valve 105 is such that the sleeve 117 is caused to follow the movement of the pilot valve 116 and thereby constitutes a hydraulic follow-up valve. The volume of the chamber 132 is thus varied in accordance with the rate of movement of the support in train.

Although the valves 41 and 60 have been indicated as actuated by rotating shafts, it is to be understood that they may be of the same general type as the valve 105 provided the members corresponding to the pilot valve 116 are connected to be moved axially in response to the elevation and train movements respectively of the gyroscope 34 relative to the ring 11.

An elevation gyrometer 139 is mounted on the bracket 14 and comprises a gyroscope in a housing 140 mounted on vertical trunnions 141 on brackets 142 attached to the bracket 14. An arm 143 extending from the housing 140 is connected by a link 144 to actuate a pilot valve slide rod 145 of a valve 146 which is similar to the valve 105 and is mounted on the bracket 14. The valve 146 contains a response volume generating chamber connected by a duct 147 (Fig. 2) to the elevation response volume duct 86.

Fluid under pressure is supplied to the valve system by a duct 148 and a constant pressure valve 148a from a pump 149 and fluid is returned from the valve system by duct 150 as described in detail in the co-pending application above referred to. Fluid under a lower pressure is supplied from pump 149 through constant pressure valve 149a and duct 100a to the chambers 89 and 97.

In the operation of this system, the driven ring 11 and the telescope 10 are caused to follow the control gyroscope 34 by the hydraulic follow-up mechanism comprising the valves 41 and 60 and the variable speed hydraulic transmission including the train motor 30 and the elevation motor 22. For example, movement in train of the gyroscope 34 and the train gimbal 35 relative to the driven ring 11 shifts the shaft 61 of valve 60 in a manner to cause a corresponding change in the generated response volume chamber 66. This change in response volume is effective through ducts 93 and 94 and chamber 95 to cause a corresponding movement of the piston 96, thereby actuating the hydraulic transmission including pump 99 and train motor 30 to cause the turntable 16 to follow the movement of the gyroscope 34 in train.

In a similar manner, movement of the gyroscope 34 in elevation varies the response volume generated by the elevation valve 41 which is supplied to the variable speed reversible hydraulic transmission including the pump 91 and the elevation motor 22 to cause the driven ring 11 to follow the movement of the gyroscope 34 in elevation. In this way the telescope 10 is effectively maintained parallel to the spin axis of the gyroscope 34 provided the relative movement is not so sudden that the follow-up control mechanism above described is unable to follow the same without appreciable lag.

During movement of the support in train the train gyrometer 106 operates in the manner described to produce a corresponding change in the volume of the chamber 132. This change is extremely rapid and the resulting change in response volume is proportional to the rate of movement of the support on which the device is mounted. This change in volume of the chamber 132 is applied to the train response volume chamber 95 to cause the variable speed transmission to drive the turntable 16 rapidly in a direction to eliminate the effect of movement of the support before an appreciable error develops between the position of the ring 11 and the gyroscope 34. Any remaining error is removed by the gyroscope 34 through the train valve 60 which controls the train motor 30 in the manner previously described to keep the driven ring 11 in registration with the spin axis of the gyroscope 34.

In a similar manner movement of the support and bracket 14 in elevation causes the elevation gyrometer 139 to generate a response volume in the valve 146 proportional to the rate of movement in elevation. This response volume is applied to the response volume chamber 87 of the elevation hydraulic transmission to produce a rapid response of the elevation motor 22 which drives the ring 11 in a direction to compensate for the movement of the support in elevation before an appreciable error can develop between the spin axis of the gyroscope 34 and the sight 10. The valve 41 then applies correctional changes in the response volume to maintain an exact follow-up control.

The above described system is particularly suited for use in devices such as tanks which are subject to sudden changes in angular position which the follow-up mechanism by itself could not follow without appreciable lag, and provides an accurate control under extreme operating conditions.

Although a specific embodiment of the invention has been shown and described for purposes of illustration, it is to be understood that the invention is capable of various uses and that changes and modifications may be made therein as will be apparent to a person skilled in the art. The invention is only to be restricted in accordance with the following claims.

What is claimed is:

1. Motion follow-up mechanism comprising a movable support, a position stabilized member and a controlled element mounted on said support, power means for driving said element relative to the support, a follow-up means actuated by said member and having means for controlling the power means to position the element in accordance with the position of the member, means measuring the rate of movement of the support, and means responsive to the rate measuring means to modify the operation of said follow-up means as a function of said rate.

2. Motion follow-up mechanism comprising a movable support, a position stabilized member on said support, means for measuring the rate of movement of the support, a controlled element on said support, power means for driving said element relative to the support, and follow-up means jointly actuated by said rate measuring means and said member and having means to control said power means to drive said element in a sense to neutralize the effect of movement of the support on the element and to position the element in accordance with the position of the member.

3. Motion follow-up mechanism comprising a movable support, a position stabilized member and a controlled element on said support, power means driving said element relative to said support, follow-up means actuated by relative movement between the member and the element and having means for controlling the power means to position the element in accordance with the position of the member, means measuring the rate of movement of said support, and means responsive to the rate measuring means to modify the operation of said follow-up means as a function of said rate.

4. Gyroscopically controlled mechanism comprising a movable support, a gyroscope mounted thereon for movement in train and in elevation, a controlled element, power means for driving said element relative to said support, follow-up means actuated by relative movement between the gyroscope and the element for controlling the power means to position the element in accordance with the angular position of the gyroscope, means measuring the rate of movement of said support in train and in elevation, and means responsive to the rate measuring means to modify the operation of said follow-up means as a function of said rates.

5. Gyroscopically controlled mechanism comprising a movable support, a gyroscope mounted thereon for movement in train, a controlled element, power means driving said element, follow-up means actuated by relative movement between the gyrosrope and the element for controlling the power means to position the element in accordance with the angular position of the gyroscope, means measuring the rate of movement of said support in train, and means responsive to the rate measuring means to modify the operation of said follow-up means as a function of said rate.

6. Gyroscopically controlled mechanism comprising a movable support, a gyroscope mounted thereon for movement in elevation, a controlled element, power means driving said element, follow-up means actuated by relative movement between the gyroscope and the element for controlling the power means to position the element in accordance with the angular position of the gyroscope, means measuring the rate of movement of said support in elevation, and means responsive to the rate measuring means to modify the operation of said follow-up means as a function of said rate.

7. Gyroscopically controlled mechanism comprising a movable support, a gyroscope mounted thereon for movement in train and in elevation, a controlled element, power means driving said element, follow-up means actuated by relative movement between the gyroscope and the element for controlling the power means to position the element in accordance with the angular position of the gyroscope, a gyrometer mounted to measure the rate of movement of said support in train, a second gyrometer mounted to measure the rate of movement of said support in elevation, and means responsive to said gyrometers to modify the operation of said follow-up means as a function of said rates.

8. Gyro controlled mechanism comprising a movable support, a gyroscope mounted thereon for movement in train and in elevation, a controlled element, variable speed reversible transmissions connected to drive said element in train and in elevation, hydraulic control means for said transmissions comprising valve means actuated by relative movement in train and in elevation between said gyroscope and said element to generate response volumes which are functions of said relative movements, means responsive to variations in said response volumes for actuating said transmissions to drive said element to follow the movement of said gyroscope, a gyrometer mounted to measure the rate of movement of said support in train and means responsive to said gyrometer to modify the operation of said follow-up means as a function of said rate.

9. Gyro controlled mechanism comprising a movable support, a gyroscope mounted thereon for movement in elevation, a controlled element, variable speed reversible transmissions connected to drive said element in elevation, hydraulic control means for said transmissions comprising valve means actuated by relative movement in elevation between said gyroscope and said element to generate response volumes which are functions of said relative movements, means responsive to variations in said response volumes for actuating said transmissions to drive said element to follow the movement of said gyroscope, a gyrometer mounted to measure the rate of movement of said support in elevation and means responsive to said gyrometer to modify the operation of said follow-up means as a function of said rate.

10. Gyro controlled mechanism comprising a movable support, a gyroscope mounted thereon for movement in train and in elevation, a controlled element, variable speed reversible transmissions connected to drive said element in train and in elevation, hydraulic control means for said transmissions comprising valve means actuated by relative movement in train and in elevation between said gyroscope and said element to generate response volumes which are functions of said relative movements, means to measure the rate of movement of said support in train and in elevation, valves controlled by said last means to generate response volumes which are functions of said rates, and means responsive to both of said response volumes to cause said transmissions to drive said element in a manner to follow the movement of said gyroscope so as to compensate for said movement of said support.

11. Gyro controlled mechanism comprising a movable support, a gyroscope mounted thereon for movement in train, a controlled element, a variable speed reversible transmission connected to drive said element in train, hydraulic control means for said transmission comprising valve means actuated by relative movement in train between said gyroscope and said element to generate a response volume which is a function of said relative movement, means to measure the rate of movement of said support in train, a valve controlled by said last means to generate a response volume which is a function of said rate, and means responsive to both of said response volumes to cause said transmission to drive said element in a manner to follow the movement of said gyroscope so as to compensate for said movement of said support.

12. Gyro controlled mechanism comprising a movable support, a gyroscope mounted thereon for movement in elevation, a controlled element, a variable speed reversible transmission connected to drive said element in elevation, hydraulic control means for said transmission comprising valve means actuated by relative movement in elevation between said gyroscope and said element to generate a response volume which is a function of said relative movement, means to measure the rate of movement of said support in elevation, a valve controlled by said last means to generate a response volume which is a function of said rate, and means responsive to both of said response volumes to cause said transmission to drive said element in a manner to follow the movement of said gyroscope so as to compensate for said movement of said support.

13. Gyro controlled mechanism comprising a movable support, a gyroscope mounted thereon for movement in train and in elevation, a controlled element, variable speed reversible transmissions connected to drive said element in train and in elevation, hydraulic control means for said transmissions comprising valve means actuated by relative movement in train and in elevation between said gyroscope and said element to generate response volumes which are functions of said relative movements, a gyrometer mounted to measure the rate of movement of said support in train, a second gyrometer mounted to measure the rate of movement of said support in elevation, valves actuated by said gyrometers to generate response volumes which are functions of said rates, and means responsive to variations in both of said response volumes for actuating said transmissions to drive said element to follow the movement of said gyroscope so as to compensate for the movement of said support.

14. Gyro controlled mechanism comprising a movable support, a gyroscope mounted thereon for movement in train, a controlled element, a variable speed reversible transmission connected to drive said element in train, hydraulic control means for said transmission comprising valve means actuated by relative movement in train between said gyroscope and said element to generate a response volume which is a function of said relative movement, a gyrometer mounted to measure the rate of movement of said support in train, a valve actuated by said gyrometer to generate a response volume which is a function of said rate, and means responsive to variations in both of said response volumes for actuating said transmission to drive said element to follow the movement of said gyroscope so as to compensate for the movement of said support.

15. Gyro controlled mechanism comprising a movable support, a gyroscope mounted thereon for movement in elevation, a controlled element, a variable speed reversible transmission connected to drive said element in elevation, hydraulic control means for said transmission comprising valve means actuated by relative movement in elevation between said gyroscope and said element to generate a response volume which is a function of said relative movement, a gyrometer mounted to measure the rate of movement of said support in elevation, a valve actuated by said gyrometer to generate a response volume which is a function of said rate, and means responsive to variations in both of said response volumes for actuating said transmission to drive said element to follow the movement of said gyroscope so as to compensate for the movement of said support.

16. Gyro controlled mechanism comprising a movable support, a gyroscope mounted thereon for movement in train and in elevation, a controlled element, variable speed reversible transmissions connected to drive said element in train and in elevation, hydraulic control means for said transmission comprising regulators having response volume chambers, valve means actuated by relative movement in train and in elevation between said gyroscope and said element to generate response volumes which are functions of said relative movement, means supplying said generated response volumes to said response volume chambers to actuate said transmissions to cause said element to follow the movement of said gyroscope, a gyrometer mounted to measure the rate of movement of said support in train, a second gyrometer mounted to measure the rate of movement of said support in elevation, valves actuated by said gyrometers to generate response volumes which are functions of said rates, and means supplying said last generated response volumes to said chambers to actuate said transmissions to eliminate the effect of said movement of said support upon said element.

17. Gyro controlled mechanism comprising a movable support, a gyroscope mounted thereon for movement in train, a controlled element, a variable speed reversible transmission connected to drive said element in train, hydraulic control means for said transmission comprising a regulator having a response volume chamber, valve means actuated by relative movement in train between said gyroscope and said element to generate a response volume which is a function of said relative movement, means supplying said generated response volume to said response volume chamber to actuate said transmission to cause said element to follow the movement of said gyroscope, a gyrometer mounted to measure the rate of movement of said support in train, a valve actuated by said gyrometer to generate a response volume which is a function of said rate, and means supplying said last generated response volume to said chamber to actuate said transmission to eliminate the effect of said movement of said support upon said element.

18. Gyro controlled mechanism comprising a movable support, a gyroscope mounted thereon for movement in elevation, a controlled element, a variable speed reversible transmission connected to drive said element in elevation, hydraulic control means for said transmission comprising a regulator having a response volume chamber, valve means actuated by relative movement in elevation between said gyroscope and said element to generate a response volume which is a function of said relative movement, means supplying said generated response volume to said response volume chamber to actuate said transmission to cause said element to follow the movement of said gyroscope, a gyrometer mounted to measure the rate of movement of said support in elevation, a valve actuated by said gyrometer to generate a response volume which is a function of said rate, and means supplying said last generated response volume to said chamber to actuate said transmission to eliminate the effect of said movement of said support upon said element.

JAMES D. TEAR.

REFERENCES CITED

The following references are of record in the file of this patent:

UNITED STATES PATENTS

| Number | Name | Date |
|---|---|---|
| 1,238,503 | Fiske et al. | Aug. 28, 1917 |
| 1,296,303 | Manly | Mar. 4, 1919 |
| 1,518,882 | Walker et al. | Dec. 9, 1924 |
| 1,559,566 | Farrell et al. | Nov. 3, 1925 |
| 2,068,490 | Hull | Jan. 19, 1937 |
| 2,160,779 | Granat | May 30, 1939 |
| 2,189,823 | Vickers | Feb. 13, 1940 |
| 2,191,792 | Hill | Feb. 27, 1940 |
| 2,339,461 | Crooke | Jan. 18, 1944 |

OTHER REFERENCES

Publication: "Why Our Tanks Can Score Hits on the Run" by Gold V. Sanders, "Popular Science," September 1944, pages 82 to 85, first advertised on back cover of "Scientific American," October 1943.